United States Patent [19]

Takano et al.

[11] Patent Number: 5,213,929

[45] Date of Patent: May 25, 1993

[54] TITANYL PHTHALOYCYANINE CRYSTAL, METHOD OF MANUFACTURE THEREOF AND ITS USE FOR ELECTROPHOTOGRAPHIC PHOTOSENSITIVE MATERIAL

[75] Inventors: Shigemasa Takano; Yoshikazu Mimura; Naoyuki Matsui; Tomohisa Gotoh; Mitsuo Usuba, all of Tokyo, Japan

[73] Assignee: NEC Corporation, Tokyo, Japan

[21] Appl. No.: 534,084

[22] Filed: Jun. 6, 1990

[30] Foreign Application Priority Data

Jun. 6, 1989 [JP] Japan .................................. 1-144889

[51] Int. Cl.$^5$ .............................................. G03G 5/06
[52] U.S. Cl. ......................................... 430/78; 430/58; 430/135; 540/141
[58] Field of Search ..................... 430/78, 58; 540/140, 540/141

[56] References Cited

U.S. PATENT DOCUMENTS

| | | | |
|---|---|---|---|
| 4,521,504 | 6/1985 | Sakuma et al. ...................... | 430/57 |
| 4,728,592 | 3/1988 | Ohaku et al. ......................... | 430/59 |
| 4,898,799 | 2/1990 | Fujimaki et al. .................. | 430/78 X |
| 4,910,109 | 3/1990 | Yokoya et al. ........................ | 430/49 |
| 4,994,566 | 2/1991 | Mimura et al. .................... | 430/58 X |
| 5,112,711 | 5/1992 | Nguyen et al. .................... | 430/78 X |

Primary Examiner—Roland Martin
Attorney, Agent, or Firm—Sughrue, Mion, Zinn, Macpeak & Seas

[57] ABSTRACT

A new composition of titanyl phthalocyanine is provided. This composition has in its infrared absorption spectrum characteristically strong absorptions at absorption wavenumbers (in unit of cm$^{-1}$) of 1490±2, 1415±2, 1332±2, 1119±2, 1072±2, 1060±2, 961±2, 893±2, 780±2, 751±2 and 730±2, and has an extremely high solvent stability and dispersibility, and a large photoelectric conversion efficiency. The new form of composition can be obtained by adding to titanyl phthalocyanine, compounds of other phthalocyanines or naphthalocyanines as additives, and treating the amorphous composition of the mixture to crystallize the composition. By applying an appropriate binder, with the novel composition crystals as a charge generation agent, on a substrate, it is possible to obtain an electrophotographic photosensitive material that has a charge generation layer with an extremely high dispersibility and an extremely large photoelectric conversion efficiency.

7 Claims, 5 Drawing Sheets

TITANYL PHTHALOYCYANINE CRYSTAL, METHOD OF MANUFACTURE THEREOF AND ITS USE FOR ELECTROPHOTOGRAPHIC PHOTOSENSITIVE MATERIAL

BACKGROUND OF THE INVENTION

The present invention relates to a titanyl phthalocyanine composition having a new crystal form, a process for its manufacture and its use as a highly photosensitive material for electrophotography.

It is well known that phthalocyanines, particularly metallo-phthalocyanines, have an excellent photoconductive property and some of them have been used for preparation of electrophotographic photosensitive materials. Recently, high definition and high speed electrophotographic type optical printers that use a laser beam or a light emitting diode as the light source have been in widespread use accompanying advances in the nonimpact printing technology, and an active development in photosensitive bodies that can meet the requirements of these devices is under way.

Particularly when a laser beam is used as a light source, there is a need to obtain a photosensitive material having a photosensitivity up to a near infrared region. It is because mostly a semiconductor laser diode is used owing to the merits of compactness, cheapness and simplicity, but their oscillation wavelength is now limited to a relatively longer wavelength range of a near infrared region. Accordingly, it is not appropriate to use conventional photosensitive materials, which have been used for electrophotographic copying machines and have a sensitivity in a visible region, with a semiconductor laser light source.

It is known that some organic materials satisfy the need as described above mentioned. They are, for example, squaric acid methine dyes, indoline dyes, cyanine dyes, pyrylium dyes, polyazo dyes, phthalocyanine dyes, naphthoquinone dyes, etc. At present, however, the squaric acid methine dyes, indoline dyes, cyanine dyes and pyrylium dyes enable to obtain a longer wavelength range but are lacking in a utilizable stability, that is, repeating property; the polyazo dyes are difficult to obtain a longer wavelength range and also have disadvantages in their production; and naphthoquinone dyes have a problem in their sensitivity.

On the other hand, the phthalocyanine dyes have spectrum sensitivity peaks in the long wavelength region of not less than 600 nm, have high sensitivities and further change their spectrum sensitivities in accordance with the kinds of their center metals and their crystal forms. They are therefore considered as suitable for dyes for use with a semiconductor laser light source, and so research and development of phthalocyanine dyes have been intensively conducted.

Among the phthalocyanine compounds studied hitherto, particularly as those showing high sensitivities in the long wavelength region of not less than 780 nm, there may be mentioned, x-type non-metalophthalocyanine, E-type copper phthalocyanine, vanadyl phthalocyanine, etc.

In order to obtain a higher sensitivity, it has been attempted to use a vacuum evaporated film of phthalocyanine as a charge generation layer to produce a laminated type photosensitive material. In effect, some phthalocyanines of relatively high sensitivities have been obtained by using metals of groups IIIa and IV of the periodic table as center metals. Such metalophthalocyanines are described in, for example, Japanese Patent Laid-open Nos. 211,149/82, 148,745/82, 36,254/84, 44,054/84, 30,541/84, 31,965/84, 166,959/84, etc. Such organic photosensitive materials as above, however, necessarily become expensive, since the production of the vacuum evaporated film requires a high vacuum discharge apparatus and thus a high cost of installation.

It has also been attempted to use a resin dispersion layer of phthalocyanine, in place of said vacuum evaporated film of phthalocyanine, as a charge generation layer and to make a coating of a charge transfer layer thereon to produce a composite type photosensitive material. As for such composite type photosensitive material, there may be mentioned, for example, the photosensitive material using non-metalo-phthalocyanine as described in Japanese Patent Laid-open No. 182639/83 and that using indium phthalocyanine as described in Japanese Patent Laid-open No. 155851/84. These two are relatively high sensitivity photosensitive materials, but the former is disadvantageous in that its sensitivity is rapidly reduced in a long wavelength region of not less than 800 nm, and the latter is disadvantegeous in that its sensitivity is not sufficient for utilization, when the charge generation layer is produced by means of the resin dispersion system.

It has also been attempted in these days to use titanyl phthalocyanines having relatively high sensitive electrophotographic properties as described in Japanese Patent Laid-open Nos. 49,544/84,, 23,928/86, 109,056/86 and 275,272/87. According to this literature, it is understood that their properties are different owing to their crystal forms and that in order to produce these various crystal forms, special purification and special solvent treatment are required. Further, the solvent to be used for such treatment is one that is different from the solvent to be used in forming the dispersion coating film. It is because the various crystals to be formed have a tendency to easily grow in the solvent for the crystal growing treatment. Thus, if such solvent is used also as the solvent for the coating, it is difficult to control the crystal form and the particle size. This causes low stability of the coating material and eventually the electrostatic properties are significantly damaged. Therefore, ordinarily in the treatment of forming the coating material, a chlorine series solvent such as chloroform, which does not substantially promote the crystal growth, is used. This solvent however does not always show a good dispersion property for the titanyl phthalocyanine, and thus causes some problems in the dispersion stability of the coating material.

SUMMARY OF THE INVENTION

It is an object of the present invention to provide a titanyl phthalocyanine composition, and a method of manufacturing the same, with satisfactory crystal stability and dispersibility in a solvent used for forming it into a coating material, and having an excellent photosensitivity.

It is another object of the present invention to provide an electrophotographic photosensitive material which uses the new titanyl phthalocyanine crystal as a charge generating layer.

As a result of an intensive investigation on the polymorphic transition behavior of a titanyl phthalocyanine crystal which can improve the aforementioned shortcomings and can be put into practical use as a highly sensitive charge generation agent, the present inventers have succeeded in developing a new crystal form which has an excellent stability and a high dispersibility in the solvent and a high photoelectric conversion efficiency, which led to the present invention.

Namely, the present invention provides a titanyl phthalocyanine composition which shows a new infrared absorption spectrum and has an excellent photoconductivity that can be obtained by adding to titanyl phthalocyanine other phthalocyanines or compounds of naphthalocyanines that will be described later, and crystallizing the mixture of the noncrystalline compositions by treating it with tetrahydrofuran.

DETAILED DESCRIPTION OF THE INVENTION

The compounds of phthalocyanines and the compounds of naphthalocyanines that are used in the present invention can be obtained by such well-known methods as described in "Phthalocyanine Compounds" (Rheinhold Publishing Company, 1963) and "Phthalocyanines" (CRC Publications, 1983) by Moser and Thomas, or other appropriate methods.

For example, titanyl phthalocyanine can readily be synthesized from 1,2-dicyanobenzene (0-phthalodinitrile) or its derivative and a metal or a metallic compound in accordance with a known method.

In the case of the titanium oxyphthalocyanines, for example, it can readily be synthesized according to the reaction formula shown in (1) or (2) below.

As for the organic solvent, a high boiling point organic solvent inert to the reaction, for example, nitrobenzene, quinoline, α-chloronaphthalene, β-chloronaphthalene, α-methylnaphthalene, methoxynaphthalene, diphenylether, diphenylmethane, diphenylethane, ethyleneglycol dialkylether, diethyleneglycol dialkylether, triethyleneglycol dialkylether, or the like to preferred. The preferable reaction temperature ordinarily is 150°–300° C. and particularly 200°–250° C.

According to the present invention, the thus obtained crude titanyl phthalocyanine compound is subjected to a non-crystallization treatment and then to a tetrahydrofuran treatment. Before these treatments, it is preferable to remove the organic solvent used in the condensation reaction by using alcohols such as methanol, ethanol or isopropyl alcohol; or ethers such as tetrahydrofuran or 1,4-dioxane; and then to effect a hot water treatment. Particularly it is preferable to do washing until the pH value of the washing liquor after the hot water treatment becomes about 5 to 7.

It is further preferable to subsequently effect a treatment with an electron donating solvent such as 2-ethoxyethanol, diglyme, dioxane, tetrahydrofuran, N,N-dimethylformamide, N-methylpyrrolidone, pyridine or morpholine.

Further, as aza porphin derivatives there are various kinds of porphins such as tetrapyridinoporhiladine in which one or more of the benezene nuclei of phthalocyanine are replaced by the quinoline nuclei, and as metallo-phthalocyanines, one may mention various kinds that contain copper, nickel, cobalt, zinc, tin, aluminum, titanium or the like.

Moreover, as the substituents of the phthalocyanines and the naphthalocyanines, there are amino group, nitro group, alkyl group, alkoxy group, cyano group, mercapto group, halogen atom and the like, and the sulfonic acid group, carboxylic acid group or their metallic salts, ammonium salts, amine salts or the like may be mentioned as relatively simple ones. Further, it is possible to introduce various substituents to the benezene nuclei via the alkylene group, sulfonyl group, carbonyl group, imino group or the like, and examples thereof include those which are known as anticoagulants or crystal transformation inhibitors in the technical field of conventional phthalocyanine pigments (see, for example, U.S. Pat. Nos. 3,973,981 and 4,088,507) or those that are not yet published. In connection with the methods of introducing these substituents, those methods that are well-known will be omitted from the discussion. In addition, methods that have not yet been published will be described as reference examples in connection with the embodiments that are presented below.

In the present invention, the composition ratio between titanyl phthalocyanine and the aza porphin derivatives or metal-free or metallo-phthalocyanine which may have substituents in benzene nuclei, or metal-free or metallo-phthalocyanine which may have substituents in naphtyl nuclei suffices if it is greater than 100 to 50 (in parts by weight), preferably in the range of 100 to (20–0.1) (in parts by weight). If the ratio exceeds the above level, crystals obtained will contain many individual crystals other than the mixed crystal composition, so that it becomes difficult to discriminate the new material of the present invention in the infrared spectra or the X-ray diffraction spectra. (These mixed compositions will be referred to as titanyl phthalocyanine compositions hereinafter.)

Although noncrystalline titanyl phthalocyanine compositions can be obtained by a single chemical or mechanical method, it is preferable to obtain them by the combinations of various kinds of methods.

For example, non-crystalline particles can be obtained by weakening the coagulating force between the particles by an acid pasting method, acid slurry method or the like, and then grinding the particles by any mechanical treating method. As for a grinding apparatus, a kneader, a Bumbury's mixer, an attritor, an edge runner mill, a roll mill, a ball mill, a sand mill, a SPEX mill, a homomixer, a disperser, an agitator, a jew crusher, a stamp mill, a cutter mill, a micronizer, etc. may be used, but these apparatuses are examples only, and should not be construed as imposing any limitation to the grinding apparatus to be used. The acid pasting method, which is well known as a chemical treatment process, is one to pour a pigment dissolved in concentrated sulfuric acid of not less than 95% or a pigment in the form of a sulfate into water or ice water to precipitate it for separation. It is possible to obtain non-crystalline particles in better condition by maintaining the sulfuric acid and water preferably not higher than 5° C., and by pouring the sulfuric acid slowly into water under high speed stirring.

It is also possible to employ a method of grinding crystalline particles for a very long time by a direct mechanical treatment apparatus, a method of grinding the particles obtained by the acid pasting method after treatment by the solvent mentioned above, or the like. The non-crystalline particles may be obtained by sublimation. For example, the titanyl phthalocyanine composition obtained by any of the above mentioned processes is heated to 500°–600° C. under vacuum to sublime it and deposit it on a substrate.

New stable crystal can be obtained by treating the non-crystalline titanyl phthalocyanine composition obtained as above-mentioned, in tetrahydrofuran. The treatment in tetrahydrofuran is performed by stirring in any stirring apparatus 1 part by weight of non-crystalline titanyl phthalocyanine composition and 5–300 parts by weight of tetrahydrofuran. As for temperature, either heating or cooling is possible, and the crystal growth becomes rapid when heated and slow when cooled. As for the stirring apparatus, not only a usual stirrer but also a supersonic dispersing apparatus, a comminuting apparatus such as a ball mill, a sand mill, a homo-mixer, a disperser, an agitator or a micronizer, and a mixing apparatus such as a conical blender or a V-shape mixer may suitably be used. These stirring apparatuses are mentioned only as examples and do not limit the apparatus to be used. After the stirring treatment, filtration, washing and drying treatments are generally carried out to obtain a stabilized crystal form of the titanyl phthalocyanine. It is also possible to omit the filtration and the drying treatments, to thereby obtain a coating material by adding, if necessary, resins, etc. to the dispersion. This is very effective to save process steps when the titanyl phthalocyanine crystal of the present invention is used as a coating film of an electrophotographic photosensitive material or the like.

Figure 1:
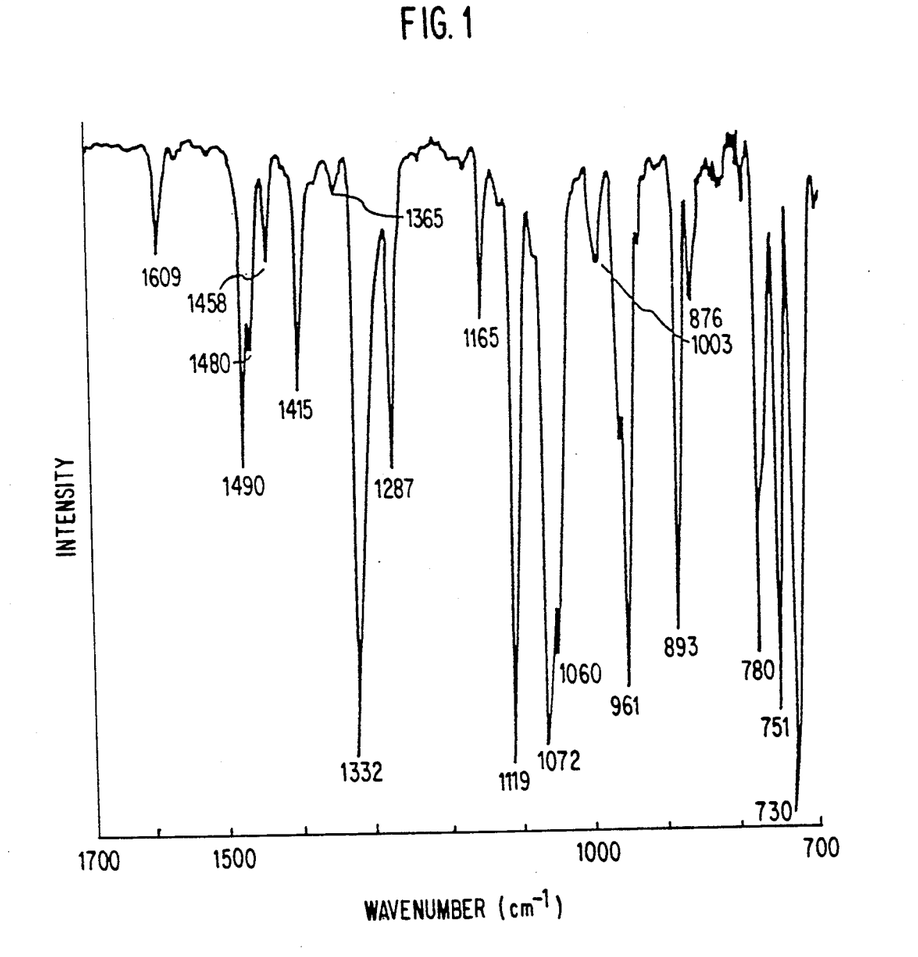
FIG. 1 is an infrared absorption spectrum for the titanyl phthalocyanine composition in accordance with the present invention.
Figure 2:
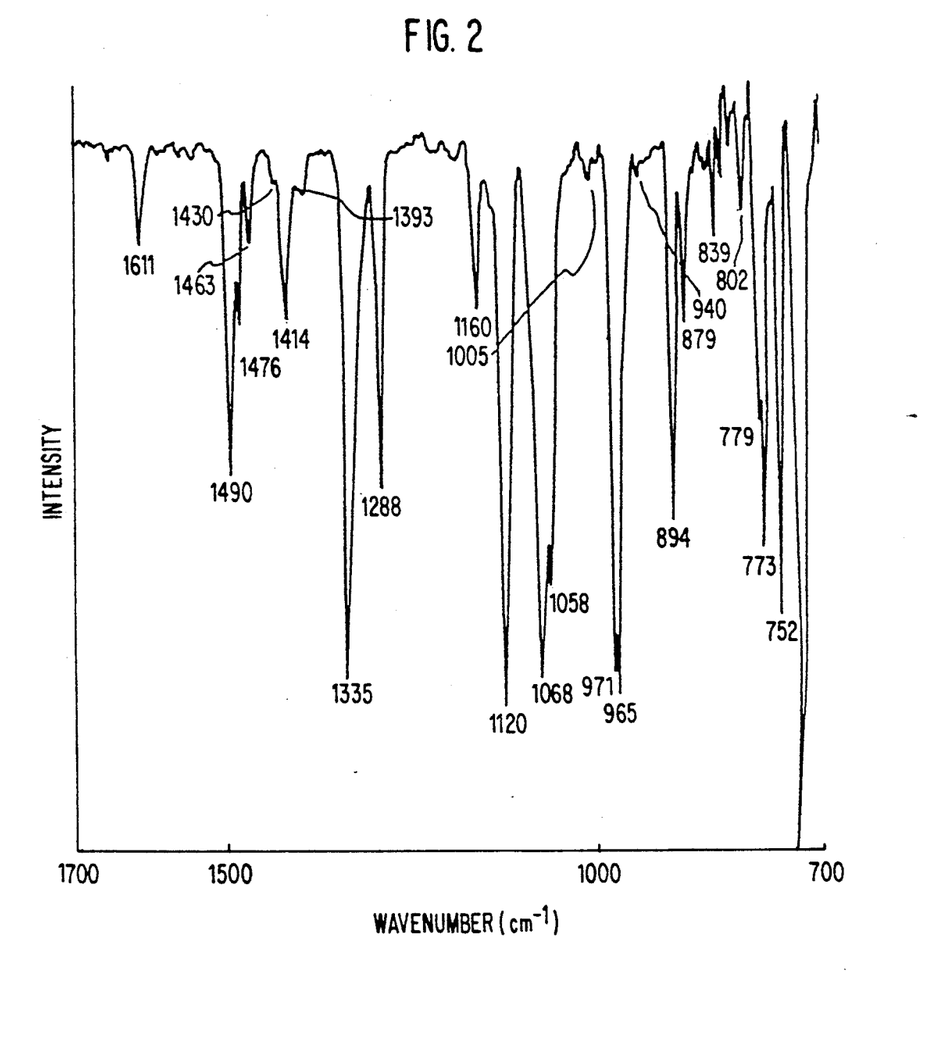
FIG. 2 and FIG. 3 show infrared absorption spectra for well-known titanyl phthalocyanines obtained by the comparative examples 2 and 1, respectively.

An infrared absorption spectrum of the titanyl phthalocyanine composition of the present invention obtained as in the above is shown in FIG. 1. The titanyl phthalocyanine shows characteristically strong absorption peaks at wavenumbers (in the unit of $cm^{-1}$, where errors of $\pm 2$ are included) 1490, 1415, 1332, 1119, 1072, 1060, 961, 893, 780, 751 and 730, and peculiar peaks at wavenumbers 1480, 1365, 1165 and 1003. The infrared absorption spectrum of titanyl phthalocyanine treated by N-methylpyrrolidone (FIG. 3), and the infrared absorption spectrum of titanyl phthalocyanine treated by the acid paste method (the treatment method for obtaining the -type phthalocyanine described in "Phthalocyanine Compounds" (published in 1963) by Mozer and Thomas) is also shown (FIG. 2). From a comparison of these infrared absorption spectra it can be confirmed that the titanyl phthalocyanine composition obtained by the above method is of a novel kind.

Further, the X-ray diffraction patterns obtained by using the Cukα line are shown in FIGS. 4 to 7. In the titanyl phthalocyanine composition there are two kinds, namely, one whose Bragg angle $2\theta$ (including an error range of $\pm 0.2°$) in the X-ray diffraction pattern has a strongest diffraction peak at 27.3° and strong peaks at 9.7° and 24.1°, and the other which has a strongest peak at 27.3° and strong peaks at 7.4°, 22.3°, 24.1°, 25.3° and 28.5°. From the fact that the intensity of the diffracted line is in general approximately proportional to the size of each crystal plane, the above-mentioned difference is considered due to the difference in the degree of growth of each crystal plane of crystals with identical structure.

The titanyl phthalocyanine of the present invention consists of satisfactory crystals with extremely high stability which do not show any substantial change in the infrared absorption spectrum even when they are further heated and stirred in tetrahydrofuran in an attempt to enhance the crystal growth.

Further, it is desirable in preparing the electrophotographic photosensitive material of the present invention to laminate an undercoat layer, a charge generation layer and a charge transport layer in this order on a conductive substrate. However, the lamination may be in the order of an undercoat layer, the charge transport layer and the charge generation layer, or the electrophotographic photosensitive material may be formed by coating the charge generation agent and the charge transport agent dispersed in an appropriate resin on an undercoat layer. It is to be noted that the undercoat layer in these cases may be omitted if so desired. By coating the titanyl phthalocyanine composition according to the present invention as the charge generation agent on a substrate by using an appropriate binder, it is possible to obtain the charge generation layer which has an extremely high dispersibility and an extremely large photoelectric conversion efficiency.

The coating may be applied by means of a spin coater, an applicator, a spray coater, a bar coater, a dip coater, a doctor blade, a roller coater, a curtain coater, a bead coater, or the like so that a film having a thickness of 0.01–5 microns, and preferably 0.1–1 micron may be formed after drying. The drying is carried out preferably by heating at 40°–200° C. for ten minutes to six hours in stagnant or blown air.

The binder for use in forming the charge generation layer by coating may be selected from a wide scope of an insulating resin and also from an organic photoconductive polymer such as poly-N-vinylcarbazole, polyvinyl anthracene or polyvinyl pyrene. As for the insulating resin, polyvinyl butyral, polyarylate such as a polycondensate of bisphenol A and phthalic acid or the like, polycarbonate, polyester, phenoxy resin, polyvinyl acetate, acrylic resin, polyacrylamine resin, polyamine resin, polyvinyl pyridine, cellulosic resin, urethane resin, expoxy resin, silicon resin, polystyrene, polyketone, polyvinyl chloride, copolymer of vinyl chloride and vinyl acetate, polyvinyl acetal, polyacrylonitrile, phenol resin, melamine resin, casein, polyvinyl alcohol, polyvinyl pyrrolidone, etc. may be mentioned. The amount of the resin to be incorporated into the charge generation layer is suitably not more than 100 weight % preferably not more than 40 weight %. Further, the resin may be used either singularly or in combination of two of more. The solvent for the resin is selected in accordance with the kind of resin to be used, preferably so that no bad influence may be imparted to the application of coatings of the charge transport layer and undercoat layer as explained hereinafter. Such a solvent is, for example, an aromatic hydrocarbon such as benzene, xylene, ligroin, monochlorobenzene, dichlorobenzene or the like; a ketone such as acetone, methylethyl ketone, cyclohexanone or the like; an alcohol such as methanol, ethanol, isopropanol or the like; an ester such as ethyl acetate, methyl cellosolve or the like; an aliphatic halogenated hydrocarbon such as carbon tetrachloride, chloroform, dichloromethane, dichloroethane, trichloroethane, trichloroethylene or the like; an ether such as tetrahydrofuran, an amide such as N,N-dimethylformamide, N,N-dimethylacetoamide; and a sulfoxide such as dimethyl sulfoxide.

The charge transport layer may be formed either singularly by a charge transport agent or by a charge transport agent dissolved or dispersed in a binding resin. As for the charge transport agent, any known material can be used. The charge transport agent includes an electron transport material and a hole transport material. As for the electron transport material, an electron attractive material for example, chloroanil, bromoanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,8-trinitrothioxanthone, etc. or a high polymer of such an electron attractive material may be mentioned.

As for the hole transport material, pyrene, N-ethylcarbazole, N-isopropylcarbazole, N-methyl-N-phenylhydrazine- 3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxacine, a hydazone such as p-diethylaminobenzaldehyde-N,N-diphenylhydrazone, p-diethylaminobenzaldehyde-N-α-naphthyl-N-phenylhydrazone, p-pyrrolidinobenzaldehyde-N,N-dipheylhydrazone, 2-methyl-4-dibenzylaminobenzaldehyde-1'-ethyl-1'-benzothiazolylhydrazone, 2-methyl-4-dibenzylaminobenzaldehyde-1'-propyl-1'-benzothiazolylhydrazone, 2-methyl-4-dibenzylaminobenzaldehyde-1',1'-dipheylhydrazone, 9-ethylcarbazole-3-carboxaldehyde-1'-methyl-1'-phenylhydrazone, 1-benzyl-1,2,3,4-tetrahydroquinoline-6-carboxaldehyde-1',1'-diphenylhydrazone, 1,3,3-trimethylindolenine-ω-aldehyde-N,N-diphenylhydrazone, p-diethylbenzaldehyde-3-methyl-benzthiazolinone-2-hydrazone or the like; 2,5-bis (p-diethylaminophenyl)-1,3,4-oxadiazole, a pyrazoline such as 1-phenyl-3-(p-diethylaminostyryl)5-(p-diethylaminophenyl) pyrazoline, 1-[quinolyl(2)]3-(p-diethylaminostyryl)-5-(p-diethylaminophenyl) pyrazoline, 1-[pyridyl(2)]-3-(p-diethylaminostyryl)-5-(p-diethylaminophenyl) pyrazoline, 1-[6-methoxypyridyl (2)]-3-(p-diethylaminostyryl)-5-(p-diethylaminophenyl) pyrazoline, 1-[pyridyl (3)]-3-(p-diethylaminostyryl)-5-(p-diethylaminophenyl) pyrazoline, 1-[lepidyl(2)]-3-(p-diethylaminostyryl)-5-(p-diethylaminophenyl) pyrazoline, 1-[pyridyl(2)]-3-(p-diethylaminostyryl)-4-methyl-5-(p-diethylaminophenyl) pyrazoline, 1-[pyridyl(2)]-3-(α-methyl-p-diethylaminostyryl)5-(p-diethylaminophenyl) pyrazoline, 1-phenyl-3-(p-diethylaminostyryl)-4-methyl-5-(p-diethylaminophenyl) pyrazoline, 1-phenyl-3-(α-benzyl-p-diethylaminostyryl)-5-(p-diethylaminophenyl)-6-pyrazoline, spiropyrazoline or the like; an oxazole compound such as 2-(p-diethylaminostyryl)-6-diethylaminobenzoxacole, 2-(p-diethylaminophenyl)-4-(p-diethylaminophenyl)-5-(2-chlorophenyl)-oxazole or the like; a thiazole compound such as 2-(p-diethylaminostyryl)-6-diethylaminobenzothiazole or the like; a triarylmethane compound such as bis (4-diethylamino-2-methylphenyl)phenylmethane or the like; a polyarylalkane such as 1,1-bis(4-N,N-diethylamino-2-methylphenyl) heptane, 1,1,2,2-tetrakis(4-N,N-dimethylamino-2-methylphenyl) ethane or the like; a stilbene compound such as 1,1-diphenyl-p-diphenylaminoethylene or the like; a triarylamino compound such as 4,4'-3-methylphenylphenylaminobiphenyl or the like; poly-N-vinyl-carbazole, polyvinyl pyrene, polyvinyl anthracene, polyvinyl acridine, poly-9-vinylphenylanthracene, pyreneformaldehyde resin, ethylcarbazole-formaldehyde resin, polysilylene resin such as polymethylphenylsilylene or the like may be mentioned.

It is also possible to use an inorganic material such as selenium, selenium-tellurium amorphus silicon, cadmium sulfide or the like.

The above-mentioned charge transport material may be used either sigularly or in combination of two or more kinds.

As for the resin to be used in the charge transport layer, an insulating resin such as silicone resin, ketone resin, polymethyl methacrylate, polyvinyl chloride, acrylic resin, polyarylate, polyester, polycarbonate, polystyrene, acrylonitrile-styrene copolymer, acrylonitrile-butadiene copolymer, polyvinyl butyral, polyvinyl formal, polysulfone, polyacrylamide, polyamide, chlorinated rubber or the like; poly-N-vinylcarbazole, polyvinyl anthracene, polyvinyl pyrene or the like may be mentioned.

In order to avoid deterioration, it is possible and effective to add to the resin generally employed additives, for example, an ultraviolet absorbent, an antioxidant, etc.

The coating may be applied by means of a spin coater, an applicator, a spray coater, a bar coater, a dip coater, a doctor blade, a roller coater, a curtain coater, a bead coater or the like, so that a film having a thickness of 5–50 microns preferably 10–20 microns, may be formed after drying.

In addition to these layers, it is possible to provide the conductive substrate with an undercoat layer for the purpose of preveting any reduction of electrostatic charging property and improving an adhesive property. As for such an undercoat layer, an alcohol-soluble polyamide such as nylon-6, nylon-66, nylon-11, nylon-610, copolymerized nylon, alkoxymethylated nylon or the like, casein, polyvinyl alcohol, nitrocellulose, ethyleneacrylic acid copolymer, gelatin, polyurethane, polyvinyl bytyral and a metal oxide such as aluminum oxide or the like may be used. It is also effective to incorporate conductive particles of a metal oxide, carbon black or the like into a resin for use as an undercoat layer.

As an undercoat layer, use may be made of alcohol soluble polyamides such as nylon 6, nylon 66, nylon 11, nylon 610, copolymerized nylon and alkoxymethylated nylon, casein, polyvinyl alcohol, nitrocellulose, ethyleneacrylic acid copolymer, gelatine, polyurethane, polyvinyl-butyral, and metallic oxide such as aluminum oxide. Further, it is also effective to incorporate conductive particles of such materials as a metallic oxide or carbon black in resin.

Figure 8:
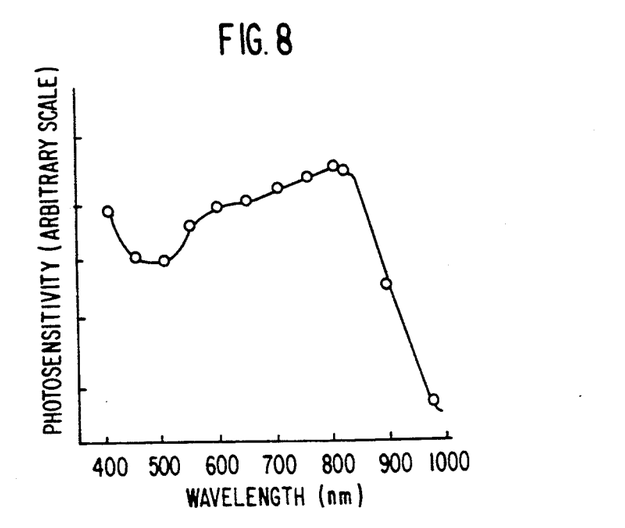
FIG. 8 shows a diagram for the spectral sensitivity characteristic of the electrophotographic photosensitive material of the present invention.

Moreover, the electrophotographic photosensitive material of the present invention has an absorption peak in the vicinity of 800 nm as shown in the spectral sensitivity characteristic curve of FIG. 8, so that in addition to copying machines and printers, the electrophotographic photosensitive material, is also effectively used for solar cells, photoelectric conversion elements and as an absorber for optical disks.

Preferred embodiments of the present invention are described below. It should be noted that the term "parts" as used in connection with these embodiments and the like signifies "parts by weight".

SYNTHESIS EXAMPLE 1

The raw materials in the quantities of 20.4 parts of 0-phthalodinitrile and 7.6 parts of titanium tetrachloride in 50 parts of quinoline were heated to be brought into reaction at 200° C. for two hours. Then, the solvent was removed by steam distillation, refined with 2% aqueous solution of hydrochloric acid, and subsequently with 2% aqueous solution of sodium hydroxide. After washing with methanol and N,N-dimethylformaldehyde, the sample was dried to obtain 21.3 parts of titanyl phthalocyanine (TiOPc).

SYNTHESIS EXAMPLE 2

The raw materials in the quantities of 14.5 parts of aminoiminoisoindolene in 50 parts of quinoline were heated at 200° C. for two hours, and after reaction, the solvent was removed by steam distillation, refined first with 2% aqueous solution of hydrochloric acid, and then with sodium hydroxide. Then, after washing thoroughly with methanol and N,N-dimethylformaldehyde and drying, 8.8 parts of metal-free phthalocyanine (yield of 70%) were obtained.

SYNTHESIS EXAMPLE 3

The raw materials in the quantities of 20 parts of 0-naphthalodinitrile in 50 parts of quinoline were brought to reaction by heating the mixture at 200° C. for 4 hours. After refining with 2% aqueous solution of hydrochloric acid, washing with methanol and N, dimethylformaldehyde, and drying, 15 parts of metal-free naphthalocyanine were obtained.

SYNTHESIS EXAMPLE 4

The mixture of 15 parts of metal-free and metallo phthalocyanines, 500 parts of dichlorotoluene, 25 parts of acetylchloride and 70 parts of aluminum chloride were stirred for eight hours at 60° to 80° C., After placing the mixture into water, filtering the solid component, washing and drying, a compound represented by the following formula was obtained.

$$MP_c(COCH_2Cl)_{1.3}$$

Various kinds of phthalocyanine derivatives are obtained by bringing the above compound into reaction with amines by a known method.

By reducing the various kinds of phthalocyanine derivatives as described above by known methods, phthalocyanine derivatives represented by the general formula are obtained. (In the formula, $R_1$ or $R_2$ is either one of hydrogen atom, alkyl group, aryl group and hetero group, or the nitrogen atom and $R_1$ and $R_2$ may form a hetero ring.) For example, to reduce the phthalocyanine derivative represented by the following formula 6 parts of potassium hydroxide were dissolved in 80 parts of diethyleneglycol, 6 parts of sufficiently finely powdered phthalocyanine derivative in the above were added thereto, and additionally 10 parts of hydrazine hydrate were gently added, and the mixture was refluxed for about ten hours. The deep blue slurry thus obtained was poured into water, filtered, washed and dried.

Table 1 shows examples of the phthalocyanine derivatives thus obtained. (In the Table and in the expamples mentioned above, MPc shows the various phthalocyanine residual groups, and the number outside of the parenthesis shows the average number of substitution as determined by the analysis. Here, M stands for $H_2$, Cu, TiO, Zn and the like.)

TABLE 1

| Synthesis Example Number | Derivative |
|---|---|
| 4-a | $CuPc(COCH_2NHC_2H_5)_{1.1}$ |
| 4-b | CuPc—(—CH₂N(CH₂—CH₂—CH₂—CH₂))₂.₂ |
| 4-c | $CuPc(CH_2CH_2NHCH_3)_{1.6}$ |
| 4-d | CuPc—(—CH₂N(CH₂—CH₂)(CH₂—CH₂)CH₂)₂.₂ |

TABLE 1-continued

| Synthesis Example Number | Derivative |
|---|---|
| 4-e | CuPc—[CH₂N(CO)₂C₆H₄]₂.₀ |

SYNTHESIS EXAMPLE 5

Various kinds of phthalocyanine derivatives obtained by bringing chlorosulfonated metal-free phthalocyanine, copper phthalocyanine, nickel phthalocyanine, cobalt phthalocyanine and titanyl phthalocyanine with various kinds of amines are shown in Table 2.

TABLE 2

| Synthesis Example Number | Derivative |
|---|---|
| 5-a | Pc—[SO₂—NH—C₆H₄—SH]₁.₁ / [SO₂—NH—NH—C₆H₅]₂.₁ |
| 5-b | TiOPc—[SO₂—NH—C₆H₄—SH]₁.₂ / [SO₂—NH—CH₃]₁.₉ |
| 5-c | Pc—[SO₂—NH—C₆H₃(SH)Br]₁.₁ / [SO₂—NH—CH₃]₂.₃ / [SO₃H]₀.₉ |
| 5-d | CuPc—(SO₃H)₀.₉ / (SO₂NH—C₆H₅)₂.₁ |
| 5-e | CuPc—[SO₂NH—C₆H₄—SO₃⁻NH₄⁺]₃.₅ |

TABLE 2-continued

| Synthesis Example Number | Derivative |
|---|---|
| 5-f | NiPc—(SO₂N—C₆H₁₁(H))₁.₇ |
| 5-g | CoPc—(SO₂NHC₃H₇)₀.₉ |

EMBODIMENT 1

One hundred parts of titanyl phthalocyanine obtained in Synthesis Example 1 and 10 parts for each of the derivatives shown in Table 1 obtained in Synthesis Example 4 were dissolved in ice-cooled 98% sulfuric acid. The mixture was allowed to precipitate in water, then filtered, washed with water and dried to obtain a homogeneous composition of the two components. Ten parts of the composition were stirred in 200 parts of tetrahydrofuran for about five hours, and after filtering, washing and drying, 9.5 parts of crystals of titanyl phthalocyanine composition were obtained.

Figure 5:
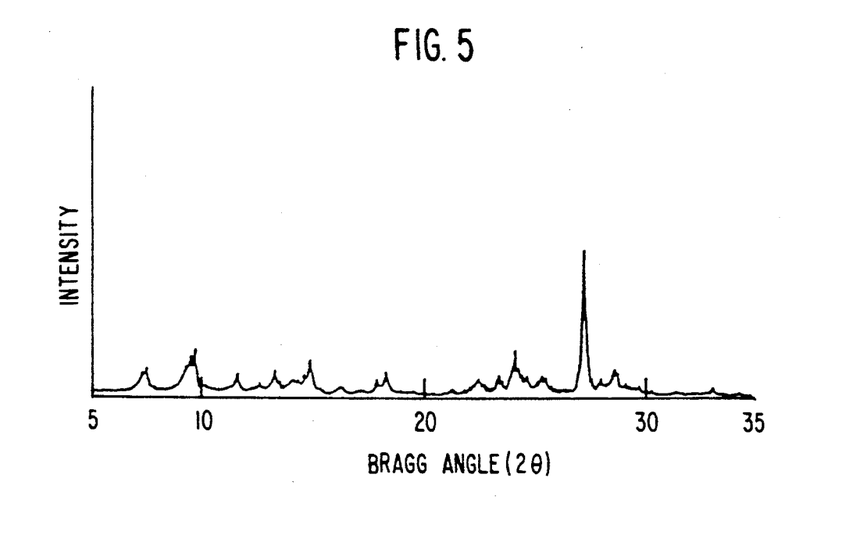
FIG. 5 is an X-ray diffraction pattern for the crystal obtained by a first embodiment of the present invention.
Figure 6:
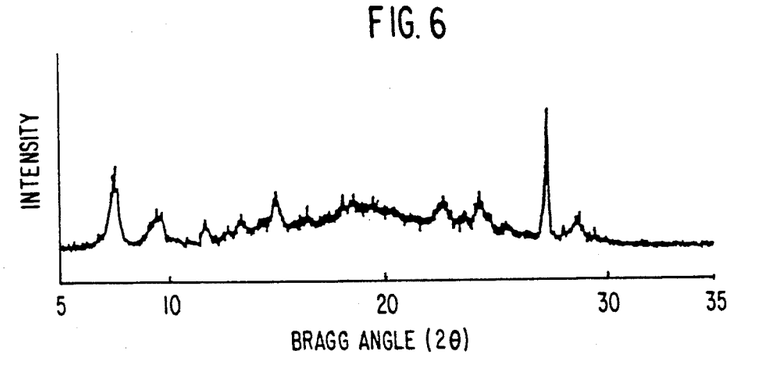
FIG. 6 is an X-ray diffraction pattern for the crystal obtained by a fifth embodiment of the present invention.

The infrared absorption spectrum of the composition thus obtained was found to be of a new type as shown in FIG. 1. In addition, its X-ray diffraction pattern is shown in FIG. 5. The titanyl phthalocyanine composition thus obtained in the amount of 0.4 g was dispersed in a ball mill with 0.3 g of polyvinylbutyral and 30 g of tetrahydrofuran (THF). A charge generation layer was obtained by coating this dispersed solution using a film applicator on a polyester film having an evaporated aluminum layer so as to obtain a film thickness after drying of 0.2 μm, and drying at 100° C. for one hour. A charge transport layer was formed by coating a solution obtained by dissolving 100 parts of diethylaminobenzaldehyde-N,N-diphenylhydrazone and 100 parts of polycarbonate resin (Z-200 manufactured by Mitsubishi Gas Chemical Co., Japan) in the mixture (in the ratio of 1 to 1) of toluene and THF on the charge generation layer obtained as described above.

As described above, an electrophotographic photosensitive material was prepared having a laminated type photosensitive layer. The half-value exposure quantity ($E_{\frac{1}{2}}$) of this photosensitive material was measured using an electrostatic copying paper testing apparatus (EPA-8100 manufactured by Kawaguchi Denki Seisakusho, Japan). Namely, the sample was electrified in a dark place by a corona discharge of −5.5 kV, then exposed to a white light of illuminance 5 flux, and the exposure quantity required for attenuating the surface potential to one half ($E_{\frac{1}{2}}$ (lux sec)) was determined.

EMBODIMENT 2

An electrophotographic photosensitive material was obtained in a manner similar to that of Embodiment 1, except that 4-dibenzylamino-2-methylbenzaldehyde-1′,1′-diphenylhydrazone was used as the charge transport substance, and further adding 2 parts of 2-hydroxy-4-methoxybenzphenone. The electrophotographic characteristics were measured.

EMBODIMENT 3

An electrophotographic photosensitive material was obtained in a manner similar to that of Embodiment 1, except that 1-phenyl-1,2,3,4-tetrahydroquinoline-6-carboxyaldehyde- 1',1'-diphenylhydrazone was used as the charge transport substance, and its characteristics were evaluated.

EMBODIMENT 4

A charge transport layer was formed by coating a solution obtained by dissolving 50 parts of refined polymethylphenylsilylene in 100 parts of toluene on a charge generating layer obtained in similar manner as in Embodiment 1, so as to have a film thickness after drying of 12 μm. Then, the electrophotographic properties were measured similar to Embodiment 1.

EMBODIMENT 5

One part of titanyl phthalocyanine obtained in Synthesis Example 1 and 0.05 part of metal-free phthalocyanine obtained in Synthesis Example 2 were dissolved in small quantities in 30 parts of 98% sulfuric acid at 5° C., and the mixture obtained was stirred for about one hour while keeping the temperature not above 5° C. Then, the sulfuric acid solution was poured gently into 500 parts of ice water stirred at high speed, and the crystals precipitated were fittered out. The crystals were washed with distilled water until no acid was detected to obtain a wet cake. The cake (assumed to contain one part of phthalocyanine) was stirred for about one hour in 100 parts of tetrahydrofuran, filtered and washed with tetrahydrofuran to obtain a tetrahydrofuran dispersed solution of titanyl phthalocyanine composition having a pigment content of 0.95 part. A portion of the solution was dried and its infrared spectrum and X-ray diffraction pattern were examined. The result was found to be similar to FIG. 1 and FIG. 6.

Next, a coating material was prepared using an ultrasonic disperser so as to contain 1.5 parts in dried weight of the present composition, one part of butyral resin (BX-5 manufactured by Sekisui Chemical Co., Japan) 10 and 80 parts of tetrahydrofuran. A charge generation layer was obtained by coating the dispersed solution on an aluminum plate having a 0.5 μm-thick coating of polyamide resin (CM-8000 manufactured by Toray, Japan) to have a dried film thickness of 0.2 μm. An electrophotographic sensitive body was formed in a manner similar to that of Embodiment 1 except for using on top of it 1,1-P-dimethylaminobenz-4,4-diphenyl-2-butyrene as the charge transport layer and further adding 2 parts of 2,4 bis-n-(octylthio)-6-(4 hydroxy-3,5-di-t-butylanilino)1,3,5-triazine, and its properties were measured.

EMBODIMENT 6

A sample was prepared similar to Embodiment 5, except for using 0.05 part of metal-free naphthalocyanine obtained in Synthesis Example 3 in place of the metal-free phthalocyanine of Embodiment 5. After confirming that its infrared absorption spectrum was similar to that in FIG. 1, it was an electrophotographic photosensitive material was prepared and measurements were taken.

EMBODIMENT 7

Copper tetrapyridinoporphyradine was synthesized in accordance with a known method.

Figure 7:
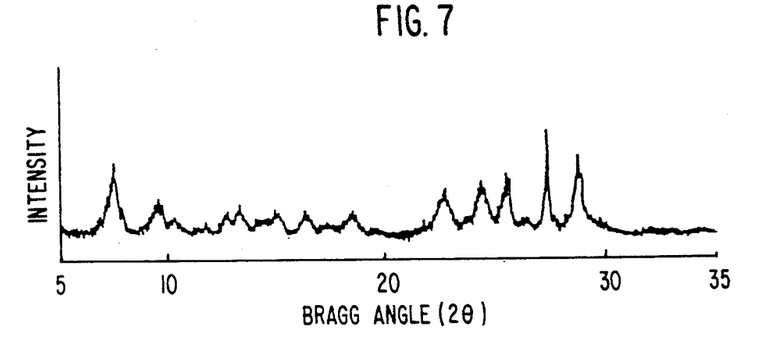
FIG. 7 is an X-ray diffraction pattern for the crystal obtained by a seventh embodiment of the present invention.

One hundred parts of titanyl phthalocyanine and 10 parts of copper tetrapyridinoporphiradine in the above were dissolved in concentrated sulfuric acid and placed into water, and the precipitate was filtered, washed with water and dried to obtain homogeneous fine crystals. Further, as a result of washing with tetrahydrofuran as in Embodiment 5, its infrared absorption spectrum and X-ray diffraction pattern were found to be as shown in FIG. 1 and FIG. 7, respectively. Then, an electrophotographic photosensitive material was formed similarly as in Embodiment 1, and its properties were measured and evaluated.

EMBODIMENT 8

Figure 4:
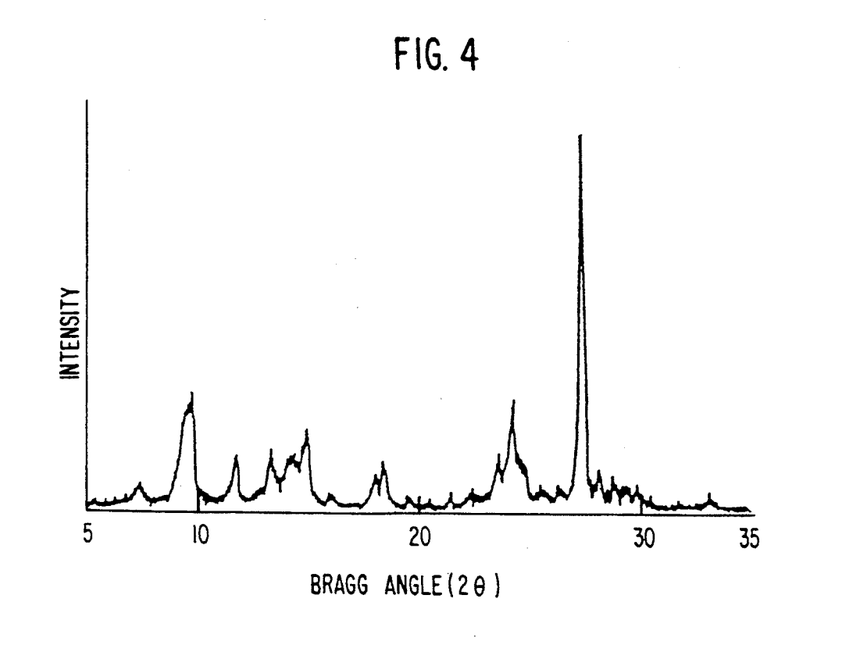
FIG. 4 is an X-ray diffraction pattern for the crystal obtained by an eighth embodiment of the present invention.

The phthalocyanine derivatives 8-a and 8-b as shown in Table 3 were synthesized in accordance with the usual method. One hundred parts of titanyl phthalocyanine and one part of chlorinated metal-free phthalocyanine in the above were dissolved in concentrated sulfuric acid was placed into water, and the precipitate was filtered, washed with water and dried to obtain homogeneous fine crystals. As a result of washing the crystals with tetrahydrofuran similar to Embodiment 5, the infrared absorption spectrum and the X-ray diffraction pattern were found to be as shown in FIG. 1 and FIG. 4, respectively. Then, a photosensitive body was formed in a manner similar to Embodiment 1 and its properties were measured and evaluated.

TABLE 3

| Embodiment Number | Derivative |
|---|---|
| 8-a | Pc $(C)_{4.0}$ |
| 8-b | Pc $(Br)_{12.1}$ |

In Table 3 above, Pc denotes the residual group of metal-free phthalocyanine.

EMBODIMENT 9

Photosensitive bodies were formed in the same manner as in Embodiment 1, except for using 5 parts each of Synthesis Examples 5-a, 5-b, 5-d, 5-f and 5-g in place of 1 part of the chlorinated metal-free phthalocyanine of Embodiment 8, and their properties were measured.

EMBODIMENT 10

Forty two parts of solution obtained by dissolving 1 part of titanyl phthalocyanine obtained in Embodiment 1, 0.7 part of p-diethylaminobenzaldehyde-1,1-diphenylhydrazone and polyester resin (Vyron 200 manufactured by Toyo Spinning Co., Japan) in a mixed solution (in the ratio of 1 to 1) of tetrahydrofuran and toluene were dispersed with glass beads in a glass container using a paint conditioner. Then, the solution was applied to an aluminum plate so as to have a film thickness after drying of 12 μm to form a single layer type electrophotographic photosensitive material. Measurements were taken in the same way as in Embodiment 1, except for using +5.5 kV is the applied voltage for electrification, and its characteristics were evaluated.

COMPARATIVE EXAMPLES 1 AND 2

Figure 3:
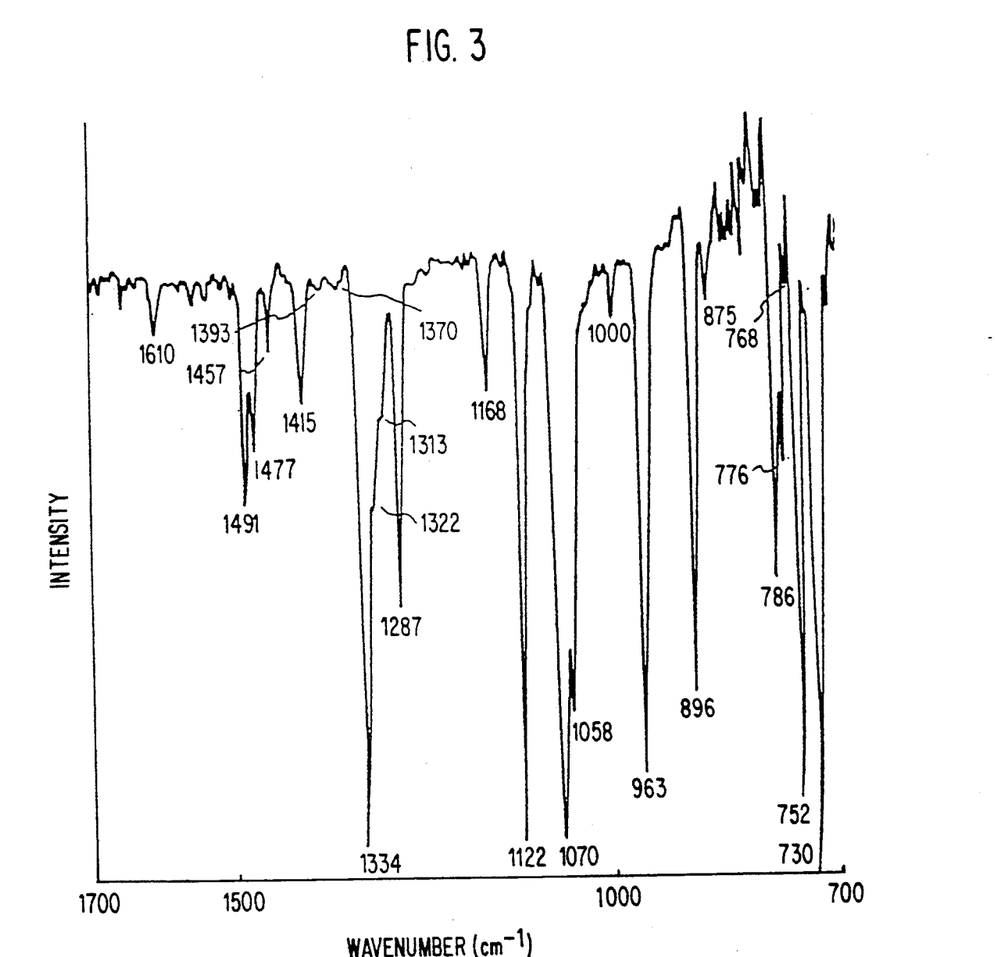

Crystals that display an infrared absorption spectrum as shown in FIG. 3 were obtained by washing oxytitanium phthalocyanine prior to sulfuric acid treatment as obtained in Synthesis Example 1 (Comparative Example 1).

Further, the infrared absorption spectrum of the amorphous phthalocyanine obtained immediately after treatment with sulfuric acid is shown in FIG. 2 (Comparative Example 2).

Using each of the samples obtained above, photosensitive bodies were formed similar to the case of Embodiment 1, except for changing the dispersion solvent to a mixed solution (in the ratio of 1 to 1) of dichloromethane and trichloroethane, and their properties were evaluated.

The initial surface potential, dark attenuation factor after 2 seconds, half-value exposure quantity, and the surface potential at 5 seconds after irradiation with light, were evaluated for above Embodiments 1 to 10 and comparative Examples 1 and 2 as summarized in Table 4.

TABLE 4

|  | $V_o$ (V) | $V_2/V_o$ (%) | $E_{\frac{1}{2}}$ (lux · s) | $V_R$ (V) |
|---|---|---|---|---|
| Embodiment |  |  |  |  |
| 1-a | −718 | 89 | 0.6 | −8 |
| 1-b | −695 | 90 | 0.9 | −12 |
| 1-c | −688 | 88 | 0.5 | −5 |
| 1-d | −697 | 89 | 0.9 | −15 |
| 1-e | −709 | 90 | 0.7 | −9 |
| 2 | −685 | 88 | 0.7 | −7 |
| 3 | −712 | 89 | 6.8 | −11 |
| 4 | −725 | 92 | 0.9 | −21 |
| 5 | −748 | 92 | 0.7 | −18 |
| 6 | −729 | 91 | 0.7 | −15 |
| 7 | −692 | 88 | 0.6 | −5 |
| 8-a | −695 | 89 | 0.4 | −4 |
| 8-b | −678 | 88 | 0.4 | −3 |
| 9-a | −695 | 87 | 0.5 | −5 |
| 9-b | −677 | 86 | 0.4 | −3 |
| 9-d | −690 | 87 | 0.5 | −5 |
| 9-f | −683 | 86 | 0.4 | −4 |
| 9-g | −672 | 86 | 0.4 | −4 |
| 10 | +655 | 92 | 1.0 | +17 |
| Comparative Example |  |  |  |  |
| 1 | −580 | 85 | 1.3 | −22 |
| 2 | −650 | 90 | 1.2 | −20 |

In the above Table, $V_o$ is the initial surface potential, $V_2$ is the surface potential after two seconds, $V_2/V_o$ is the dark attenuation factor after two seconds, $E_{\frac{1}{2}}$ is the half-value exposure quantity and $V_R$ is the surface potential at five seconds after irradiation with light.

As described above, the materials of the present invention are novel and stable crystals, and are stable against solvents. When made into coating materials, solvent selection becomes easier, enabling coating materials to be made that have excellent dispersibility and long life, and which facilitates the formation of homogeneous films that are important in the manufacture of photosensitive bodies. The electrophotographic photosensitive materials thus obtained have high photosensitivity especially in the semiconductor laser wavelength region, so that they are particularly effective for photosensitive bodies for high speed and high difinition printers.

In particular, the mixed crystal compositions according to the present invention have the following characteristics as compared to compositions that are not of mixed-crystal type. Namely:

(i) Due to an enhanced stability of the crystal form, it becomes possible to obtain coating materials with longer life (increased stability).

(ii) The sensitivity as photosensitive bodies is extremely superior, and the photoelectric conversion efficiency is further enhanced.

(iii) The particles of the crystals are made finer so that the coating materials formed become smoother, and the coatability can be enhanced.

What is claimed is:

1. A composition crystal including titanyl phthalocyanine which shows strong infrared absorptions at absorption wavenumbers (in unit of cm$^{-1}$) of 1490±2, 1415±2, 1332±2, 1287±2, 1119±2, 1072±2, 1060±2, 961±2, 893±2, 780±2, 751±2 and 730±2, under a condition satisfying a relationship as follows:

730±2, 1332±2, 1119±2≧1071±2≧961±2, 751±2≧1060±2, 893±2, 780±2>1490±2, 1827±2>1415±2, said composition crystal comprising 100 parts by weight of titanyl phthalocyanine and a total of not more than 50 parts by weight of one kind or two or more kinds selected from the group consisting of metal-free aza porphin derivatives, metallo-aza porphin derivatives, metal-free phthalocyanine, metallo-phthalocyanine, metal-free naphthalocyanine or metallo-naphthalocyanine (wherein metal-free aza porphin derivatives, metallo-aza porphin derivatives, metal-free phthalocyanine and metallo-phthalocyanine may have a substitutional group in the benzene nucleus, and metal-free naphthalocyanine and metallo-naphthalocyanine may have a substitutional group in the naphthylnucleus).

2. The composition crystal including titanyl phthalocyanine according to claim 1, which further shows peculiar peaks of infrared absorptions at wavenumbers (in unit of cm$^{-1}$) of 1480±2, 1365±2, 1165±2 and 1003±2, under a condition satisfying a relationship as follows:

1415±2<1480±2, 1165±2<1003±2≧1365±2.

3. The composition crystal including titanyl phthalocyanine according to claim 1 which shows, in its X-ray diffraction spectrum that uses the CuKα line as the source, a strongest diffraction peak at the Bragg angle (2θ±0.2°) of 27.3°, and strong diffraction peaks of 9.7° and 24.1°.

4. The titanyl phthalocyanine crystal according to claim 1 which shows, in its X-ray diffraction spectrum that uses the CuKα line as the source, a strongest diffraction peak at the Bragg angle (2θ±0.2°) of 27.3°, and strong diffraction peaks at 7.4°, 22.3°, 24.1°, 25.3° and 28.5°, under a condition satisfying a relationship as follows:

27.3>7.4≧28.5≧22.3, 24.1, 25.3.

5. A method of manufacturing a composition crystal including titanyl phthalocyanine comprising a process of stirring one part by weight of amorphous phthalocyanine composition and 5 to 300 parts by weight of tetrahydrofuran, said amorphous phthalocyanine composition comprising 100 parts by weight of titanyl phthalocyanine and a total of not more than 50 parts by weight of one kind or two or more kinds selected from the group consisting of metal-free aza porphin derivatives, metallo-aza porphin derivatives, metal-free phthalocyanine, metallo-phthalocyanine, metal-free naphthalocyanine or metallo-naphthalocyanine (wherein metal-free aza porphin derivatives, metallo-aza porphine derivatives, metal-free phthalocyanine and metallo-phthalocyanine may have a substitutional group in the benzene nucleus, and metal-free nophthalocyanine and metallo-naphthalocyanine may have a substitutional group in the naphthyl nucleus), wherein said composition crystal has in its infrared absorption wavenumber (in unit of cm$^{-1}$) of 1490±2, 1415±2, 1332±2, 1287±2, 1119±2, 1072±2, 1060±2, 961±2, 893±2, 780±2, 751±2 and 730±2, under a condition satisfying a relationship as follows:

730±2, 1332±2, 1119±2≧1072±2≧961±2, 751±2≧1060±2, 893±3, 780±2≧1490±2, 1287±2≧1415±2.

6. In an electrophotographic photosensitive material having a conductive layer and a photosensitive layer, the electrophotographic photosensitive material characterized in that said photosensitive layer has a charge generation material and a charge transport material, wherein the charge generation material is a composition crystal comprising 100 parts by weight of titanyl phthalocyanine and a total of not more than 50 parts by weight of one kind or two or more kinds selected form the group consisting of metal-free aza porphin derivatives, metallo-aza porphin derivatives, metal-free phthalocyanine, metallo-phthalocyanine, metal-free naphthalocyanine or metallo-naphthalocyanine (wherein metal-free aza porphin derivatives, metallo-aza porphin derivatives, metal-free phthalocyanine and metallo-phthalocyanine may have a substitutional group in the benzene nucleus, and metal-free naphthalocyanine and metallo-naphthalocyanine may have a substitutional group in the naphthyl nucleus), and has in its infrared absorption spectrum characteristically strong absorptions at absorption wavelength in unit of $cm^{-1}$) of $1490\pm2$, $1415\pm2$, $1332\pm2$, $1287\pm2$, $1119\pm2$, $1072\pm2$, $1060\pm2$, $961\pm2$, $893\pm2$, $780\pm2$, $751\pm2$ and $730\pm2$, under a condition satisfying a relationship as follows:

$730\pm2$, $1332\pm2$, $1119\pm2 \geqq 1072\pm2 \geqq 961\pm2$, $751\div2 \geqq 1060\pm2$, $893 \geqq 3$, $780\pm2 > 1490\pm2$, $1287\pm2 > 1415\pm2$.

7. The method of manufacturing the composition crystal including titanyl phthalocyanine as claimed in claim 5, wherein said method further comprises filtration, washing and drying after said stirring, and said washing is treated by using hot water until the pH of washing liquid after washing process becomes about 5 to 7.

* * * * *

UNITED STATES PATENT AND TRADEMARK OFFICE
CERTIFICATE OF CORRECTION

PATENT NO. : 5,213,929
DATED : May 25, 1993
INVENTOR(S) : Shigemasa TAKANO et al It is certified that error appears in the above-identified patent and that said Letters Patent is hereby corrected as shown below:

Column 1, line 34, after "laser" and insert --diode--.

Column 6, line 23, delete "Cukα" and insert --CuK$\bar{\alpha}$ --.

Column 7, line 53, delete "hydrazine- 3" and insert --hydrazino-3--.

Column 7, lines 60 to 61, delete "dipheylhydrazone" and insert --diphenylhydrazone--.

Column 7, line 65, delete "dipheylhydrazone" and insert --diphenylhydrazone--.

Column 8, line 4, before "5", insert -- - --.

Column 8, line 42, delete "sigularly" and insert --singularly--.

Column 8, line 66 delete "preveting" and insert --preventing--.

Column 10, line 42, delete "expamples" and insert --examples--.

Column 13, line 48, before "1", insert -- - --.

UNITED STATES PATENT AND TRADEMARK OFFICE
CERTIFICATE OF CORRECTION

PATENT NO. : 5,213,929
DATED : May 25, 1993
INVENTOR(S) : Shigemasa TAKANO et al It is certified that error appears in the above-identified patent and that said Letters Patent is hereby corrected as shown below:

Column 15, line 50, delete "difinition" and insert --definition--.

Claim 3, column 16, line 31 delete "CuKα" and insert --CuK$\bar{\alpha}$--.

Claim 4, column 16, line 37 delete "CuKα" and insert --CuK$\bar{\alpha}$--.

Claim 6, column 18, line 8, delete "÷" and insert --±--.

Claim 6, column 18, line 8, delete "≥3" and insert --±3--.

Signed and Sealed this

Fifth Day of April, 1994

BRUCE LEHMAN

*Attest:*

*Attesting Officer*          Commissioner of Patents and Trademarks